United States Patent Office 2,913,493
Patented Nov. 17, 1959

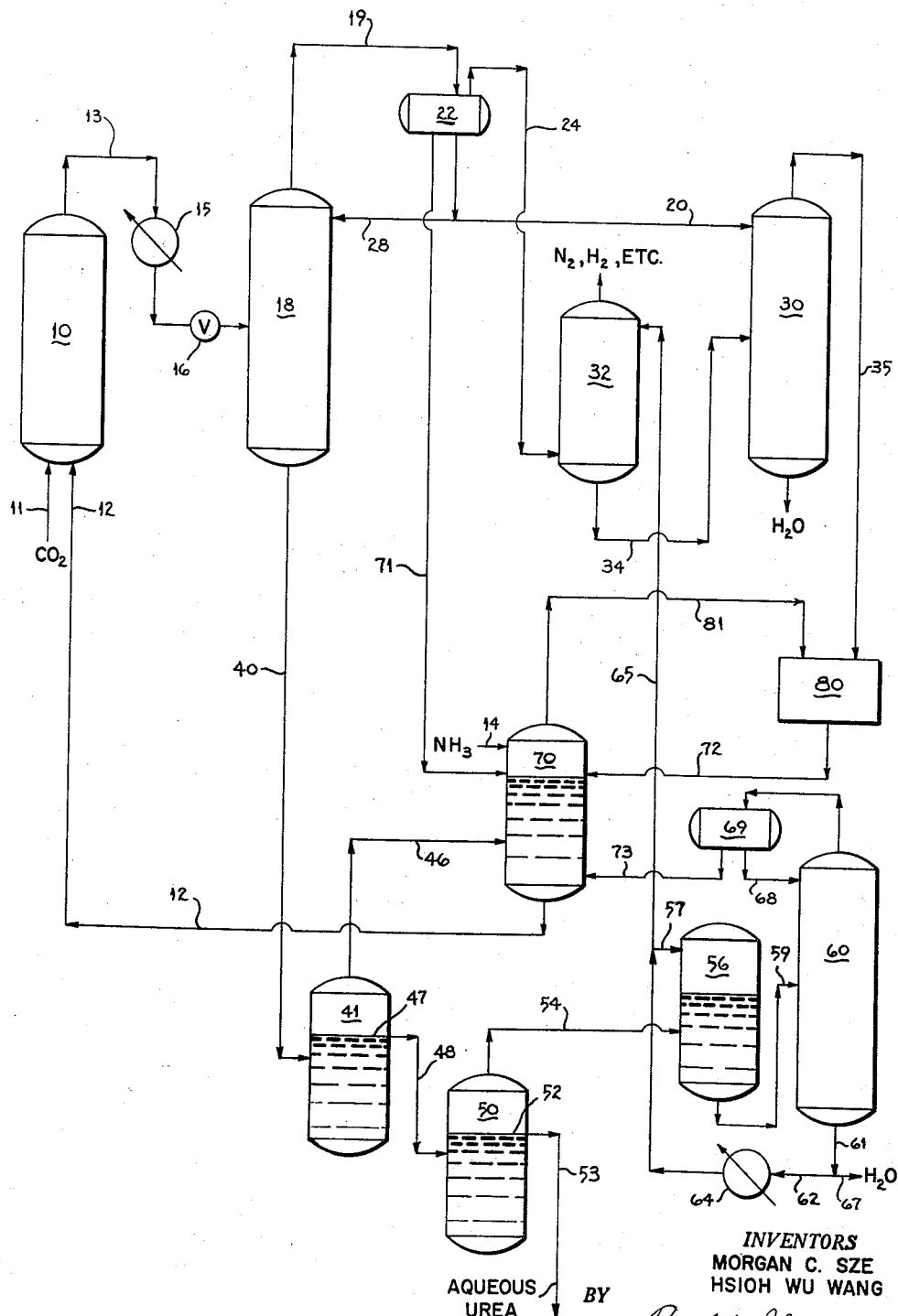

2,913,493
UREA SYNTHESIS

Morgan C. Sze, Garden City, and Hsioh Wu Wang, Freeport, N.Y., assignors to Hydrocarbon Research, Inc., New York, N.Y., a corporation of New Jersey Application October 3, 1956, Serial No. 613,729

2 Claims. (Cl. 260—555)

This invention relates to a synthesis of urea from ammonia and carbon dioxide at elevated temperatures and pressures through the intermediate production of ammonium carbamate. More particularly, it relates to an improvement in such urea synthesis process wherein ammonia and carbon dioxide are recycled to the reaction zone in the form of ammonium carbamate carried in liquid ammonia.

All modern commercial synthetic urea processes are based upon the reaction of ammonia and carbon dioxide at elevated temperatures and pressures to form urea and water along with ammonium carbamate, an intermediate product. The reactions take place in accordance with the following equations:

(1) 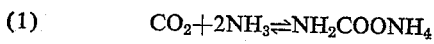
$$CO_2 + 2NH_3 \rightleftharpoons NH_2COONH_4$$

(2) 
$$NH_2COONH_4 \rightleftharpoons NH_2CONH_2 + H_2O$$

In accordance with Equation 1, two mols of ammonia and one mol of carbon dioxide react rapidly and completely at 160° to 200° C. and 120 to 300 atmospheres to form ammonium carbamate. Although this reaction is exothermic, the conversion of the carbamate into urea and water in accordance with Equation 2 is endothermic and will ordinarily vary from 40% to 50% depending on the operating conditions and limited by chemical equilibrium.

The overall effect of the foregoing reactions is exothermic and both reactions are reversible. However, since urea is relatively stable as compared with ammonium carbamate, the application of reduced pressure and heat to the reaction mixture will selectively decompose the unconverted carbamate into $NH_3$ and $CO_2$. In order to prevent the undesirable formation of biuret from the urea in the mixture, the decomposition reaction is often carried out in two stages at successively lower pressures, mainly to prevent the mixture from reaching undesirably high temperatures.

In once-through urea synthesis processes, $NH_3$ from the decomposing stage is recovered as ammonium sulphate or nitrate by absorption in the respective acid, while $CO_2$ may be vented to the atmosphere. The solution from the decomposer comprising urea, water and traces of $NH_3$ is concentrated and then processed by crystallization or prilling. The urea crystals or prills are then dried, cooled and bagged.

It has been found to be more economical, however, to recycle $NH_3$ and $CO_2$ from the carbamate decomposers to the reaction zone and thereby achieve high $NH_3$ and $CO_2$ utilization. In this way, the necessity of a by-product fertilizer plant for utilizing unreacted ammonia may be eliminated.

There are several methods known to the prior art for recycling $NH_3$ and $CO_2$ to the urea synthesis reaction zone. In one of these methods the recovered $NH_3$ and $CO_2$ gaseous mixture from the decomposer is compressed in steam heated cylinders, recycled, and combined with the fresh feed entering the reaction zone. In such a process, it is necessary to prevent formation of solid ammonium carbamate and the excessive temperature necessary to do this results in serious operating difficulties and high maintenance costs.

Another means known to the prior art for recycling $NH_3$ and $CO_2$ gases from the carbamate decomposer to the reaction zone involves the absorption of these gases with water and the subsequent recycle to the reactor of an aqueous ammoniacal solution of ammonium carbamate. In order to compensate for the relatively high proportion of water in the reactor feed, which has the effect of shifting the chemical equilibrium to give lower urea formation, it is necessary in such processes to perform the reaction at relatively high temperatures and pressures and with large quantities of excess ammonia, thereby considerably diluting the amount of converted reactants in the effluent from the reaction zone.

In another method, $NH_3$ and $CO_2$ gases from the decomposers are mixed with a hydrocarbon oil so as to form a suspension of fine solid particles of ammonium carbamate in the oil which is then recycled to the synthesis reaction zone. This not only has the disadvantage of having the oil dilute the reactants but also makes it difficult to produce a completely oil free urea product.

Still other prior methods utilize selective absorption for separating the $NH_3$ and $CO_2$ gases and then recycle considerable excess ammonia to the reaction zone while either venting or recycling the $CO_2$ gas. Although such methods have been utilized commercially, they also involve the considerable expense of building and maintaining absorption equipment in addition to the reaction system.

Summarizing, prior to the present invention, it has been found necessary to recycle $NH_3$ and $CO_2$ to the reaction zone by either (1) applying heat and pressure to the hot gases from the decomposer, (2) separating by selective absorption the components of the gas stream from the decomposer or (3) recovering and recycling the decomposed gas stream without separation, as an aqueous ammonium carbamate solution or as an oil slurry. In connection with method 3, neither water nor oil is a desirable vehicle for recycling because the former affects equilibrium adversely and the latter tends to contaminate the product. Use of either water or oil also results in additional handling problems and processing costs arising from the circulation of these extraneous materials in the urea synthesis system.

In accordance with the present invention, problems inherent in the prior art are avoided by recycling the $NH_3$ and $CO_2$ from the decomposers to the reaction zone in the form of ammonium carbamate carried in a vehicle or medium of substantially anhydrous liquid ammonia. Since excess ammonia, one of the reactants in the urea synthesis, promotes the reaction, and since it is readily available in the reactor effluent stream, its use as a recycle medium is inherently advantageous when compared to media which are inert or repressive substances and may have contaminating effects.

Accordingly, it is an object of the present invention to provide a novel, economical, and efficient method for the synthesis of urea from the reaction of ammonia and carbon dioxide at elevated temperatures and pressures.

Another object is to provide, in urea synthesis, a novel method for recycling unreacted ammonia and carbon dioxide to the reaction zone.

Still another object of this invention is to provide a method for utilizing efficiently the excess ammonia present in urea synthesis systems.

These and other objects and advanages of this invention will become apparent from the description which follows.

According to this invention, the synthetic urea process is carried out at elevated urea-forming temperatures and pressures in the presence of ammonium carbamate recycled in a medium of liquid ammonia. The reaction temperatures are in the range of about 340 to 390° F. while the pressures may be in the range of about 2700 to 4000 pounds per square inch gauge (p.s.i.g.). The ammonium carbamate which is recycled to the reaction zone may be suspended and/or dissolved in the liquid ammonia vehicle depending on temperature and pressure conditions and the ratio of carbamate to ammonia. Generally, the combined recycle and fresh feed liquid ammonia stream will contian from about 10 to 20% by weight of the carbamate.

The liquid ammonia vehicle while not completely free of water for reasons hereinafter specified will contain not more than about 3.5% by weight of water. Because of the liquid ammonia recycle stream, the reaction zone is provided with an amount of ammonia well in excess of the stoichiometric requirements, thereby shifting the reaction equilibrium toward the formation of a higher yield of urea. The gross feed into the reaction zone will have a molar ratio of $NH_3$ to $CO_2$ (including $NH_3$ and $CO_2$ in the form of carbamate) of from 6.5 to 9.0. The molar ratio of water to $CO_2$ will be in the range of 0.10 to 0.25.

The reactor effluent comprising urea, water, unconverted carbamate and excess ammonia is cooled, depressurized, and sent to a distillation zone for the removal of a major portion of the excess ammonia. Any non-condensable inert gases carried into the system by the make-up $CO_2$ stream may be withdrawn from the overhead of the ammonia still while any ammonia vapor carried by such non-condensables may be subsequently recovered.

The relatively ammonia-free liquid residue from the distillation zone is decomposed at a relatively high pressure so as to separate therefrom a gaseous product rich in ammonia and carbon dioxide and an aqueous urea-rich liquid product containing ammonium carbamate. This liquid product is sent to a second decomposition stage operated at a relatively low pressure, either atmospheric or slightly above, so as to produce as the liquid product from this second decomposition stage, an aqueous urea solution substantially free of ammonium carbamate, and an overhead vapor product.

Decomposition of the carbamate is performed in two stages in order to minimize conversion of substantial quantities of the admixed urea into biuret, which would seriously impair the purity and utility of the urea product. This problem is discussed in detail in the prior art, e.g., U.S. Patent 2,744,133.

The vapor product from the low-pressure decomposer is absorbed, distilled and condensed so as to form an ammoniacal carbamate solution containing the minimum quantity of water required to prevent precipitation of solid carbamate. This solution is then combined at elevated pressures with excess $NH_3$ from the reaction zone which has been distilled, dehydrated and liquefied, and with the vapor fraction from the first-stage or high-pressure decomposer. The resulting suspension or solution is combined with the fresh feed and introduced into the reaction zone.

Referring to the accompanying drawing which is illustrative of a preferred embodiment of the invention, reactor 10 is fed with $CO_2$ flowing through line 11. Substantially anhydrous liquid $NH_3$ having ammonium carbamate suspended and/or dissolved therein is fed to the reactor through line 12. The reactor effluent withdrawn through line 13 contains urea, water, unconverted carbamate and excess $NH_3$.

In passing through cooler 15, the temperature of the effluent is reduced to about 300° F. and pressure reducing valve 16 reduces the pressure to the point where the major portion of the excess $NH_3$ may be effectively distilled off as overhead from ammonia still 18. This still is operated at elevated pressure, e.g., 240 p.s.i.g.

Line 19 carries excess or free $NH_3$ from still 18 to drum 22 wherein any non-condensable inert gases entering the system with the make-up $CO_2$ stream are separated and withdrawn through line 24. About 85 to 90% of the free $NH_3$ entering still 18 by way of valve 16 is withdrawn from drum 22 as liquid by way of line 71. Another small portion of this free $NH_3$ is passed through line 20 as reflux to a second ammonia still 30 operating at a lower elevated pressure of about 215 p.s.i.g. Liquid $NH_3$ is also returned from drum 22 by way of line 28 as reflux to ammonia still 18.

The non-condensables such as $H_2$ and $N_2$ are withdrawn from drum 22 through overhead line 24 and passed to absorber 32 wherein $NH_3$ vapor in these gases is recovered by absorption in water.

The aqueous ammonia solution withdrawn from the bottom of absorber 32 through line 34 is pumped to the second ammonia still 30 wherein the dissolved $NH_3$ is separated and passes overhead to be condensed. The liquid flows through line 35 to a receiver in an ammonia compression and refrigeration system 80.

The bottoms from ammonia still 18 comprising urea, water, unconverted carbamate and some free $NH_3$ passes through line 40 into high-pressure decomposer 41 operated at a relatively high pressure in the range of about 90 to 175 p.s.i.g., and at a temperature in the range of about 235° to 248° F.

The vapor overhead from decomposer 41 flows through line 46 to absorber 70 wherein it is combined with other ammonia streams hereinafter described. The liquid level in high-pressure decomposer 41 is indicated by line 47 and liquid is withdrawn through line 48. Steam or other heating medium is used to provide heat for the decomposition of the carbamate in decomposer 41.

The liquid effluent from high-pressure decomposer 41 passes through line 48 into low-pressure decomposer 50 wherein residual ammonium carbamate is decomposed. Low-pressure decomposer 50 is operated at atmospheric or slightly elevated pressure in the range up to about 15 p.s.i.g. and at a temperature of about 235° to 248° F. Decomposer 50 is also provided with suitable heating means. The liquid from decomposer 50 withdrawn near liquid level 52 through line 53 is an aqueous urea solution of about 80 to 85% by weight concentration containing only traces of free $NH_3$, which is sent to an evaporator for concentration and is finished in the usual way by either crystallization or prilling, followed by drying and bagging.

The vaporous overhead from low-pressure decomposer 50 passing through line 54 comprises $NH_3$, $CO_2$ and steam and flows into low-pressure absorber 56 wherein it is contacted with a cold water stream entering by way of line 57. The liquid from absorber 56 passes through line 59 and is pumped into a third ammonia still 60 which operates at an elevated pressure of about 200 to 225 p.s.i.g.

In tower 60, all the dissolved $NH_3$ and $CO_2$ in the solution from low-pressure absorber 56 is stripped off. The tower bottoms (water) withdrawn through line 61 is essentially free of $NH_3$ and $CO_2$ and a portion thereof is recycled by way of line 62 through cooler 64 and thence recirculated by way of line 57 to low-pressure absorber 56 with another portion of the recycle water stream being passed through line 65 to ammonia absorber 32.

In order to maintain the water balance of the entire system, a small portion of the bottoms from tower 60 is discarded through line 67. The overhead from ammonia still 60 is collected in drum 69 as an ammoniacal carbamate solution containing the minimum quantity of water required to prevent the precipitation of solid carbamate and is sent through line 73 to high-pressure absorber 70. Part of the solution in drum 69 flows back through line 68 as reflux to tower 60.

High-pressure absorber 70 operates at normal temperatures and at elevated pressures of the order of 80 to 150 p.s.i.g. Its function is to recover the $NH_3$ and $CO_2$ vapors from high-pressure decomposer 41 so that they may be recycled to reactor 10 through line 12 in the form of ammonium carbamate dissolved and/or suspended in liquid ammonia.

Fresh feed $NH_3$ entering the system through line 14 and the overhead from the three ammonia stills 18, 30, and 60 are combined in high-pressure absorber 70 after passing through lines 71, 72 and 73, respectively. The $NH_3$ and $CO_2$ vapors from high-pressure decomposer 41 also enter absorber 70 through line 46.

The cooling of the gas and liquid and removal of the reaction heat is achieved with a conventional ammonia compression and refrigeration system 80. The $NH_3$ from still 30 enters a receiver in refrigeration system 80 through line 35 while the overhead from high-pressure absorber 70 enters by way of line 81. The solution or slurry from absorber 70 is supplied to reactor 10 through line 12.

There will be in the gross feed to reactor 10 a certain minimal amount of water not exceeding 3.5% by weight since the operation of ammonia still 60 requires the absence of solid carbamate depositing in the tower and its condenser. For this reason, a minimum amount of water must be kept in the overhead and this water will eventually be returned to reactor 10.

High-pressure absorber 70 is designed to recover the $NH_3$ and $CO_2$ from high-pressure decomposer 41. Its design is based on the concept that when a mixture of $NH_3$ and $CO_2$ gas is bubbled through a pool of liquid ammonia, ammonium carbamate is formed as fine particles suspended in the agitated liquid ammonia after its solubility in liquid ammonia has been exceeded.

By operating reactor 10 with a high excess ammonia and with very little water in the gross feed, it becomes possible to obtain a very high carbamate conversion. This is most desirable for two reasons. First, the recycling of excess ammonia is inherently simplified and requires little power expediture (per unit of urea produced). Secondly, with the high conversion per pass of carbamate, the unconverted carbamate which must be recycled becomes a small quantity per unit of urea produced. By using liquid ammonia as the recycling vehicle, it becomes possible to pump the mixture back to the required high pressure for recycling. This results in a significant power saving per unit of urea produced as compared to methods involving compression.

The high conversion per pass also results in a significant reduction of the size of the recycling equipment for a given production rate of urea. This together with lower installed compressor horsepower leads to a materially lower capital investment.

Unlike processes of the prior art, essentially no water is recycled and higher conversion of carbamate can be obtained at lower reaction temperature and pressure. The process of this invention has the further advantage of decreased corrosion.

As a specific example of the operation of the urea synthesis system just described, the reactor is operated at 380° F. and 3000 p.s.i.g. and is supplied at the rate of 3570 pounds per hour with 98% by volume pure $CO_2$ preheated to 245° F. A mixture at 240° F. of liquid $NH_3$ and ammonium carbamate is fed to the reactor at the hourly rate of 13,104 pounds. The ammonia-carbamate mixture contains by weight 85.6% $NH_3$, 11.9% ammonium carbamate, and 2.5% water. The gross feed to the reactor has a molar ratio of 7 $NH_3$ to 1 $CO_2$ to 0.18 $H_2O$. Under these conditions, the theoretical conversion of carbamate to urea is 85%, and the actual conversion reaches about 80%.

The reactor effluent is cooled to about 300° F., and upon distillation at about 240 p.s.i.g., about 86% of the excess ammonia is recovered as liquid essentially free of water. The bottom product from the first ammonia still containing urea, water, unconverted carbamate and free ammonia passes to the high-pressure decomposer operating at 248° F. and 118 p.s.i.g. The treated liquid then passes from the high-pressure decomposer to the low-pressure decomposer, operated at 248° F. and 5 p.s.i.g., whence the liquid which issues is an aqueous urea solution of about 83% by weight concentration, containing only traces of free $NH_3$. This solution is evaporated, prilled and dried to yield urea prills at the hourly rate of 4800 pounds.

Recovery of the overhead streams from the high- and low-pressure decomposers is effected, respectively, in the high-pressure absorber operated at 113 p.s.i.g. and 68° F. and in the low-pressure absorber operated at 110° F. and atmospheric pressure.

The high-pressure absorber is fed with fresh liquid ammonia at 30° F. and 35 p.s.i.g. at the hourly rate of 2775 pounds, the balance of the input thereto comprising recovered $NH_3$ and carbamate and the mixed $CO_2$ and $NH_3$ gaseous effluent from the high-pressure decomposer. The liquid mixture is then recycled from the high-pressure absorber to the reaction zone.

Although preferred embodiments of the invention have been set forth, many modifications and variations will be obvious to those skilled in the art. Accordingly, the invention is not to be construed with any limitations other than those recited in the appended claims.

What is claimed is:

1. In a process for synthesizing urea which comprises reacting ammonia and carbon dioxide at a temperature in the range of 340 to 390° F. and at a pressure in the range of 2700 to 4000 p.s.i.g. in the presence of recycled ammonium carbamate, withdrawing from the synthesis zone a reaction mixture consisting essentially of urea, water, ammonium carbamate and excess ammonia, removing the major portion of said excess ammonia from said reaction mixture by distillation, decomposing ammonium carbamate in the remaining mixture at a pressure in the range of 90 to 175 p.s.i.g. to separate therefrom a first gaseous fraction rich in ammonia and carbon dioxide and leave an aqueous urea-rich liquid fraction containing ammonia carbamate, and further decomposing ammonium carbamate in said urea-rich liquid fraction at a pressure in the range of 0 to 15 p.s.i.g. to separate therefrom a second gaseous fraction rich in ammonia and carbon dioxide and leave an aqueous solution of urea substantially free of ammonium carbamate, the improvement which comprises refluxing ammonia during the distillation of said reaction mixture so that said major portion of said excess ammonia is removed substantially free of water and carbon dioxide, liquefying the bulk of the removed ammonia, forming from said second gaseous fraction an ammoniacal ammonium carbamate solution containing the minimum quantity of water to prevent precipitation of ammonium carbamate, combining said ammonium carbamate solution, said first gaseous fraction and the liquefied ammonia removed from said reaction mixture with fresh feed liquid ammonia to provide a recycle feed comprising a slurry of ammonium carbamate in liquid ammonia, and introducing said recycle feed and fresh feed carbon dioxide as a gross feed into said synthesis zone for the aforesaid reaction of ammonia and carbon dioxide, said gross feed having a molar ratio of ammonia to carbon dioxide in the range of 6.5:1 to 9.0:1 and a molar ratio of water to carbon dioxide not exceeding 0.25:1.

2. The process of claim 1 wherein, after the bulk of the ammonia removed from the reaction mixture is liquefied, the remaining minor gaseous fraction containing non-condensable gases and ammonia is scrubbed with a liquid arbsorbent for ammonia, the unabsorbed non-condensable gases are discarded, and the absorbed ammonia is recovered and recycled to the synthesis zone.

(References on following page)

References Cited in the file of this patent

UNITED STATES PATENTS

| | | |
|---|---|---|
| 1,868,106 | Kuss et al. | July 19, 1932 |
| 1,908,995 | Miller | May 16, 1933 |
| 1,923,489 | Krase et al. | Aug. 22, 1933 |
| 1,937,116 | Hetherington | Nov. 28, 1933 |
| 2,116,881 | De Ropp | May 10, 1938 |
| 2,212,847 | Porter | Aug. 27, 1940 |
| 2,214,068 | Rogers et al. | Sept. 10, 1940 |